(12) United States Patent
Jubb et al.

(10) Patent No.: US 7,651,965 B2
(45) Date of Patent: *Jan. 26, 2010

(54) SALINE SOLUBLE INORGANIC FIBRES

(75) Inventors: Gary Anthony Jubb, Stourport on Severn (GB); Craig John Freeman, Stourport on Severn (GB)

(73) Assignee: The Morgan Crucible Company PLC, Windsor, Berkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/275,035

(22) Filed: Nov. 20, 2008

(65) Prior Publication Data
US 2009/0127489 A1 May 21, 2009

Related U.S. Application Data

(63) Continuation of application No. 10/493,340, filed as application No. PCT/GB03/00003 on Jan. 2, 2003, now Pat. No. 7,470,641.

(30) Foreign Application Priority Data
Jan. 4, 2002 (GB) ................................ 0200162.6

(51) Int. Cl.
C03C 13/00 (2006.01)
C03C 13/06 (2006.01)
E04B 1/74 (2006.01)

(52) U.S. Cl. ............................ 501/36; 501/35; 501/67; 501/70; 252/62

(58) Field of Classification Search .................. 501/35, 501/36, 67, 70; 252/62
See application file for complete search history.

(56) References Cited

U.S. PATENT DOCUMENTS

| | | | |
|---|---|---|---|
| 1,759,919 A | 5/1930 | Singer |
| 2,051,279 A | 8/1936 | Thorndyke |
| 2,116,303 A | 5/1938 | Coss |
| 2,155,107 A | 4/1939 | Tyler et al. |
| 2,308,857 A | 1/1943 | Bowes |
| 2,335,220 A | 11/1943 | Edwards |
| 2,428,810 A | 10/1947 | Powell |
| 2,520,168 A | 8/1950 | Powell |
| 2,520,169 A | 8/1950 | Powell |
| 2,576,312 A | 11/1951 | Minnick |
| 2,577,431 A | 12/1951 | Powell |
| 2,823,416 A | 2/1958 | Powell |
| 3,183,104 A | 5/1965 | Thomas |
| 3,189,471 A | 6/1965 | Thomas |
| 3,348,956 A | 10/1967 | Ekdahl |
| 3,348,994 A | 10/1967 | Rees et al. |
| 3,380,818 A | 4/1968 | Smith |
| 3,402,055 A | 9/1968 | Harris et al. |
| 3,449,137 A | 6/1969 | Ekdahl |
| 3,459,568 A | 8/1969 | Rinehart |
| 3,573,078 A | 3/1971 | Bacon |
| 3,597,179 A | 8/1971 | Simmons |
| 3,687,850 A | 8/1972 | Gagin |
| 3,783,092 A | 1/1974 | Majumdar |
| 3,799,836 A | 3/1974 | Rogers et al. |
| 3,804,608 A | 4/1974 | Gaskell et al. |
| 3,804,646 A | 4/1974 | Dumbaugh, Jr. |
| 3,835,054 A | 9/1974 | Olewinski et al. |
| 3,854,986 A | 12/1974 | Chvalovsky et al. |
| 3,887,386 A | 6/1975 | Majumdar |
| 3,900,329 A | 8/1975 | Grubb et al. |
| 3,904,424 A | 9/1975 | Aoki et al. |
| 3,969,121 A | 7/1976 | Atkiinson |
| 4,002,482 A | 1/1977 | Coenen |
| 4,011,651 A | 3/1977 | Bradbury |
| 4,014,704 A | 3/1977 | Miller |

(Continued)

FOREIGN PATENT DOCUMENTS

AU 255803 7/1963

(Continued)

OTHER PUBLICATIONS

Brochure showing Manville Corporation entitled "Insulating Fiber Products" for New Superwool™ Product (two pages, undated).

(Continued)

Primary Examiner—Karl E Group
Assistant Examiner—Elizabeth A Bolden
(74) Attorney, Agent, or Firm—Smith Gambrell & Russell LLP

(57) ABSTRACT

Thermal insulation is provided for use in applications requiring continuous resistance to temperatures of 1260° C. without reaction with alumino-silicate firebricks, the insulation comprises fibers having a composition in wt %

$65\% < SiO_2 < 86\%$ $MgO < 10\%$ $14\% < CaO < 28\%$ $Al_2O_3 < 2\%$ $ZrO_2 < 3\%$ $B_2O_3 < 5\%$ $P_2O_5 < 5\%$ $72\% < SiO_2 + ZrO_2 + B_2O_3 + 5*P_2O_5$ $95\% < SiO_2 + CaO + MgO + Al_2O_3 + ZrO_2 + B_2O_3 + P_2O_5$

Addition of elements selected from the group Sc, La, Ce, Pr, Nd, Sm, Eu, Gd, Tb, Dy, Ho, Er, Tm, Yb, Lu, Y or mixtures thereof improves fiber quality and the strength of blankets made from the fibers.

17 Claims, 1 Drawing Sheet

U.S. PATENT DOCUMENTS

| | | | |
|---|---|---|---|
| 4,036,654 A | 7/1977 | Yale et al. |
| 4,041,199 A | 8/1977 | Cartwright |
| 4,046,948 A | 9/1977 | Zlochower |
| 4,047,965 A | 9/1977 | Karst et al. |
| 4,054,472 A | 10/1977 | Kondo et al. |
| 4,055,434 A | 10/1977 | Chen et al. |
| 4,078,939 A | 3/1978 | Schwochow et al. |
| 4,153,439 A | 5/1979 | Tomic et al. |
| 4,205,992 A | 6/1980 | Mogensen et al. |
| 4,238,213 A | 12/1980 | Pallo et al. |
| 4,251,279 A | 2/1981 | Ekdahl |
| 4,274,881 A | 6/1981 | Langton et al. |
| 4,303,722 A | 12/1981 | Pilgrim |
| 4,325,724 A | 4/1982 | Froberg |
| 4,342,581 A | 8/1982 | Neubauer et al. |
| 4,351,054 A | 9/1982 | Olds |
| 4,366,251 A | 12/1982 | Rapp |
| 4,377,415 A | 3/1983 | Johnson et al. |
| 4,430,369 A | 2/1984 | Payne |
| 4,437,192 A | 3/1984 | Fujiu et al. |
| 4,443,550 A | 4/1984 | Kume et al. |
| 4,482,541 A | 11/1984 | Telfer et al. |
| 4,555,492 A | 11/1985 | Ekdahl et al. |
| 4,604,097 A | 8/1986 | Graves, Jr. et al. |
| 4,615,988 A | 10/1986 | Le Moigne et al. |
| 4,661,134 A | 4/1987 | Hartung |
| 4,678,659 A | 7/1987 | Drake et al. |
| 4,693,740 A | 9/1987 | Noiret et al. |
| 4,830,989 A | 5/1989 | Trivedi et al. |
| 4,857,489 A | 8/1989 | Bearden |
| 4,873,209 A | 10/1989 | Gnyra |
| 4,957,559 A | 9/1990 | Tiesler et al. |
| 5,032,552 A | 7/1991 | Nonami et al. |
| 5,055,428 A | 10/1991 | Potter |
| 5,108,957 A | 4/1992 | Cohen et al. |
| 5,121,748 A | 6/1992 | Ditz et al. |
| 5,135,893 A | 8/1992 | Dohi et al. |
| 5,217,529 A | 6/1993 | Tiesler et al. |
| 5,248,637 A | 9/1993 | Taneda et al. |
| 5,250,488 A | 10/1993 | Thelohan et al. |
| 5,290,350 A | 3/1994 | Besnard et al. |
| 5,312,806 A | 5/1994 | Mogensen |
| 5,332,699 A | 7/1994 | Olds et al. |
| 5,346,868 A | 9/1994 | Eschner |
| 5,401,693 A | 3/1995 | Bauer |
| 5,407,872 A | 4/1995 | Komori et al. |
| 5,552,213 A | 9/1996 | Eschner et al. |
| 5,583,080 A | 12/1996 | Goldberg et al. |
| 5,614,449 A | 3/1997 | Jensen |
| RE35,557 E | 7/1997 | Thelohan et al. |
| 5,691,255 A | 11/1997 | Jensen et al. |
| 5,714,421 A | 2/1998 | Olds et al. |
| 5,811,360 A | 9/1998 | Jubb |
| 5,821,183 A | 10/1998 | Jubb |
| 5,843,854 A | 12/1998 | Karppinen et al. |
| 5,874,375 A | 2/1999 | Zoitos et al. |
| 5,880,046 A | 3/1999 | Delvaux et al. |
| 5,912,201 A | 6/1999 | Couture et al. |
| 5,928,975 A | 7/1999 | Jubb |
| 5,955,389 A | 9/1999 | Jubb |
| 5,962,354 A | 10/1999 | Fyles et al. |
| 5,994,247 A | 11/1999 | Jubb et al. |
| 5,998,315 A | 12/1999 | Jubb |
| 6,030,910 A | 2/2000 | Zoitos et al. |
| 6,037,284 A | 3/2000 | Holstein et al. |
| 6,043,172 A | 3/2000 | Hart |
| 6,043,173 A | 3/2000 | Hart |
| 6,060,414 A | 5/2000 | Holstein et al. |
| 6,180,546 B1 | 1/2001 | Jubb et al. |
| 6,214,102 B1 | 4/2001 | Vandermeer |
| 6,287,994 B1 | 9/2001 | Hart |
| 6,358,872 B1 | 3/2002 | Karppinen et al. |
| 7,153,796 B2 * | 12/2006 | Jubb et al. ................ 501/36 |
| 7,470,641 B2 * | 12/2008 | Jubb et al. ................ 501/36 |
| 2003/0162019 A1 | 8/2003 | Zoitos et al. |
| 2005/0014624 A1* | 1/2005 | Jubb et al. ................ 501/35 |
| 2006/0094583 A1* | 5/2006 | Freeman et al. ........... 501/36 |

FOREIGN PATENT DOCUMENTS

| | | |
|---|---|---|
| CA | 588493 | 12/1959 |
| CA | 1 271 785 | 7/1990 |
| CA | 2017344 | 11/1990 |
| CA | 2043699 | 12/1991 |
| DE | 1 94 2 991 | 3/1970 |
| DE | 27 48 127 | 5/1978 |
| DE | 2732 387 | 11/1978 |
| DE | 34 44 397 A1 | 6/1986 |
| DE | 39 05 394 C2 | 9/1989 |
| DE | 44 17 230 A1 | 11/1995 |
| DE | 44 17 231 A1 | 11/1995 |
| DE | 44 21 120 A1 | 12/1995 |
| DE | 44 47 576 A1 | 5/1996 |
| DE | 44 47 577 A1 | 5/1996 |
| EP | 0 019 600 A3 | 11/1980 |
| EP | 0 076 677 A1 | 4/1983 |
| EP | 0 091 866 A1 | 10/1983 |
| EP | 0 135 449 A1 | 3/1985 |
| EP | 0 144 349 B1 | 6/1985 |
| EP | 0 390 223 A2 | 10/1990 |
| EP | 0 399 320 A1 | 11/1990 |
| EP | 0 399 652 A1 | 11/1990 |
| EP | 0 412 878 A1 | 2/1991 |
| EP | 0 459 897 A1 | 12/1991 |
| EP | 0 546 984 A1 | 6/1993 |
| EP | 0 585 547 A1 | 3/1994 |
| EP | 0 586 797 A1 | 3/1994 |
| EP | 0 588 251 A1 | 3/1994 |
| EP | 0 591 696 A1 | 4/1994 |
| EP | 0 685 434 B1 | 12/1995 |
| EP | 0 710 628 A2 | 5/1996 |
| EP | 0 936 199 A2 | 8/1999 |
| EP | 0 115 673 B1 | 7/2001 |
| EP | 1 184 348 B1 | 3/2002 |
| EP | 1 288 172 B1 | 3/2003 |
| EP | 1 323 687 A2 | 7/2003 |
| FI | 63007 | 12/1982 |
| FR | 1 149 289 | 12/1957 |
| FR | 1 165 275 | 10/1958 |
| FR | 1 589 410 | 3/1970 |
| FR | 2 118 026 | 7/1972 |
| FR | 2 662 687 | 12/1991 |
| FR | 2 662 688 | 12/1991 |
| GB | 520247 | 4/1940 |
| GB | 790397 | 2/1958 |
| GB | 810773 | 3/1959 |
| GB | 1 045 848 | 10/1966 |
| GB | 1 204 472 | 9/1970 |
| GB | 1 209 244 | 10/1970 |
| GB | 1 273 205 | 5/1972 |
| GB | 1 399 556 | 7/1975 |
| GB | 1 446 910 | 8/1976 |
| GB | 1 462 173 | 1/1977 |
| GB | 1 473 908 | 5/1977 |
| GB | 1 532 612 | 11/1978 |
| GB | 2 011 379 B | 7/1979 |
| GB | 2 081 703 A | 2/1982 |
| GB | 2 083 017 A | 3/1982 |
| GB | 2 122 537 A | 1/1984 |
| GB | 2 150 553 A | 7/1985 |
| GB | 2 164 557 A | 3/1986 |
| GB | 2 259 700 A | 3/1993 |
| GB | 2 289 673 | 11/1995 |
| GB | 2 383 793 | 7/2003 |

| | | |
|---|---|---|
| JP | 49-27620 | 3/1974 |
| JP | 51-13819 | 2/1976 |
| JP | 51-43429 A | 4/1976 |
| JP | 51-133311 | 11/1976 |
| JP | 52-4519 | 1/1977 |
| JP | 52-139113 | 11/1977 |
| JP | 56-54252 | 5/1981 |
| JP | P2001-180977 | 7/2001 |
| SE | 104380 | 4/1942 |
| SU | 276349 | 7/1970 |
| SU | 259337 | 8/1970 |
| SU | 607807 | 5/1978 |
| WO | WO 84/04296 | 11/1984 |
| WO | WO 85/02393 | 6/1985 |
| WO | WO 85/02394 | 6/1985 |
| WO | WO 86/04807 | 8/1986 |
| WO | WO 87/05007 | 8/1987 |
| WO | WO 89/12032 | 12/1989 |
| WO | WO 90/02713 | 3/1990 |
| WO | WO 90/11756 | 10/1990 |
| WO | WO 91/11403 | 8/1991 |
| WO | WO 92/07801 | 5/1992 |
| WO | WO 92/09536 | 6/1992 |
| WO | WO 93/15208 | 8/1993 |
| WO | WO 93/19596 | 10/1993 |
| WO | WO 93/22251 | 11/1993 |
| WO | WO 94/14717 | 7/1994 |
| WO | WO 94/14718 | 7/1994 |
| WO | WO 94/15883 | 7/1994 |
| WO | WO 94/23801 | 10/1994 |
| WO | WO 95/21799 | 8/1995 |
| WO | WO 95/29135 | 11/1995 |
| WO | WO 95/31410 | 11/1995 |
| WO | WO 95/31411 | 11/1995 |
| WO | WO 95/32925 | 12/1995 |
| WO | WO 95/32926 | 12/1995 |
| WO | WO 95/32927 | 12/1995 |
| WO | WO 95/35265 | 12/1995 |
| WO | WO 96/01793 | 1/1996 |
| WO | WO 96/02478 | 2/1996 |
| WO | WO 96/04213 | 2/1996 |
| WO | WO 96/04214 | 2/1996 |
| WO | WO 96/14274 | 5/1996 |
| WO | WO 96/16913 | 6/1996 |
| WO | WO 96/30314 | 10/1996 |
| WO | WO 97/16386 | 5/1997 |
| WO | WO 97/20782 | 6/1997 |
| WO | WO 97/21636 | 6/1997 |
| WO | WO 97/29057 | 8/1997 |
| WO | WO 97/30002 | 8/1997 |
| WO | WO 97/49643 | 12/1997 |
| WO | WO 98/02394 | 1/1998 |
| WO | WO 01/19744 A1 | 3/2001 |
| WO | WO 03/059835 | 7/2003 |
| WO | WO 03/060016 A1 | 7/2003 |

OTHER PUBLICATIONS

Thermal Ceramics Product Information Brochure entitled Superwool Blanket (Grade X-607), 2 pages (undated).
Brochure by Carborundum Company entitled Insulfrax® Specialty Glass Fiber Product Specification, 8 pages (Mar. 2003).
Brochure by Paraisten Kalkki Oy entitled Hohe Temperaturen? Großer Wärmeverlust? PARGAS-Platten 1000° C, 3 pages (undated).
"Fiber Glass," J. Mohr and W. Rowe, Table of Contents and pp. 4-27 (Van Nostrand Reinhold Company) (undated).
"Prediction of Glass Durability as a Function of Glass Composition and Test Conditions:Thermodynamics and Kinetics," C.M. Jantzen, *Advances in the Fusion of Glass*, pp. 24.1-24.17 (undated).
"Stability of Radioactive Waste Glasses Assessed from Hydration Thermodynamics," M.J. Plodinec, C.M. Jantzen, and G.G. Wicks, pp. 755-758 (undated).

"Nuclear Waste Glass Durability: I, Predicting Environmental Response from Thermodynamic (Pourbaix) Diagrams," Carol M. Jantzen, *Journal of American Ceramic Society*, 75(9):2433-2448 (1992).
"Calcium Aluminate Glass Fibers: Drawing from Supercooled Melts Versus Inviscid Melt Spinning," F.T. Wallenberger et al., *Materials Letters*, 11:229-235 (1991).
"Chemical Durability of Glass," *Chemistry of Glasses*, Chapter 6, 2nd Edition, A. Paul, pp. 179-218 (Chapman and Hall) (1990).
*Chemical Abstracts*, 110(10):373, Abstract No. 81274g (equivalent to CN-A-87 108257) (1989).
"Low-Cost Reinforcing Fibers Promise a High Level of Performance," S.A. Dunn, *Modern Plastics International*, pp. 50-51 (Jun. 1989).
"The Behaviour of Mineral Fibres in Physiological Solutions," H. Förster, *Proceedings of 1982 WHO IARC Conference*, Copenhagen, vol. 2, pp. 27-55 (1988).
"Chemical Durability," *Glass Science and Technology*, Chapter 34, pp. 377-388 (Elsevier) (1988).
"Glass-Water Interactions," H. Scholze, *Journal of Non-Crystalline Solids*, 102:1-10 (1988).
"The Reactions of MMMF in a Physiological Model Fluid and in Water," R. Klingholz & B. Steinkopf, *Proceedings of 1982 WHO IARC Conference*, Copenhagen, vol. 2, pp. 61-86 (1988).
"Solubility and Durability of Manmade Mineral Fibers in Physiological Fluids," J. Bauer, et al., (nineteen pages; dated no later than 1988).
Standard Test Methods for Fire Tests of Building Construction and Materials, ASTM Designation: E119-88, pp. 1-21 (1988).
"An In Vitro Study of the Chemical Durability of Siliceous Fibres," H. Scholze & R. Conradt, *Annals of Occupational Hygiene*, 31:48, pp. 683-692 (1987).
"In vitro Study on Siliceous Fibres," H. Scholze & R. Conradt, *Proceedings of 1986 WHO IARC Conference*, 25 pages (1986).
"Chemical Durability of Asbestos and of Man-made Mineral Fibres in vivo," B. Bellman et al., *Aerosol Scientist*, vol. 17(3):341-345 (1986).
"Prediction of Nuclear Waste Glass Durability from Natural Analogs," C.M. Jantzen, *Advances in Ceramics*, vol. 20, 10 pages, Nuclear Waste Management II (1986).
"Thermodynamic Model of Natural, Medieval and Nuclear Waste Glass Durability," C.M. Jantzen et al., *Journal of Non-Crystalline Solids*, 67:207-233 (1984).
"A New Approach to Predicting the Durability of Glasses from Their Chemical Compositions," R.G. Newton and A. Paul, *Glass Technology*, 21(6):307-309 (Dec. 1980).
"Inviscid Spinning of Filaments via Chemical Jet Stabilization," R.E. Cunningham, L.F. Rakestraw and S.A. Dunn, *The American Institute of Chemical Engineers Symposium Series*, No. 180, vol. 74:20-31 (1978).
"Chemical Durability of Glasses in the Systems $SiO_2$-CaO-$Na_2O$-$R_mO_n$," H. Ohta and Y. Suzuki, *Ceramic Bulletin*, vol. 57(6):602-604 (1978).
"A Scale of Acidity and Basicity in Glass," *The Glass Industry*, Kuan-Han Sun, pp. 73-74 (Feb. 1948).
"Mineral Wool," by J. R. Thoenen, *Encyclopedia of Chemical Technology*, Kirk & Othmer, vol. 9:122-132 (The lnterscience Encyclopedia, Inc., New York (copyright 1952).
"Mineral Wool," U.S. Bureau of Mines Information Circular I.C. 6984R, pp. 1-62 (Jun. 1939).
"Slag Wools," *Inorganic Fibres*, pp. 111-127 (undated).
"Preparation and Properties of Barium Ferrite Using Hot-Rolled Mill Scale," Chien, Yung-Tsen, et al., *J. Am. Ceram. Soc.*, vol. 72(8):1328-1332 (1989).
"The Dissolution of Asbestos Fibres in Water," Gronow, J., *Clay Minerals*, vol. 22:21-35 (1987).
"Man-Made Vitreous Fibers: An Overview of Studies on Their Biologic Effects," Gross, P., *Am. Ind. Hyg. Assoc. J.*, vol. 47(11):717-723 (Nov. 1986).
"Solubility of Asbestos and Man-Made Fibers In Vitro and In Vivo: Its Significance in Lung Disease," Morgan, A., et al, *Environmental Research*, vol. 39:475-484 (1986).

"Corrosion Phenomena in Glass Fibers and Glass Fiber Reinforced Thermosetting Resins," Bledzki, A. et al., *Composites Science & Technology*,.( Harris and Chou, eds., Elsevier Applied Science Publishers), vol. 23:263-285 (1985).

"Fiber Toxicology," Leineweber, J.P., *J. Occupational Medicine*, vol. 23(6):431-434 (Jun. 1981).

"Development of a Deoiling Process for Recycling Millscale," *Recycling in the Steel Industry, Proceedings of the 1st Process Technology Conference*, vol. 1:184-187, Washington, D.C., (Mar. 25-26, 1980).

"Effects of Glass Surface Area to Solution Volume Ration on Glass Corrosion," Ethridge, E.C. et al., *Physics and Chemistry of Glasses*, vol. 20(2):35-40 (Apr. 1979).

"Glass Compositions for Glass Fibers," Moriya, Ichiro, et al., *Chemical Abstracts*, vol. 89, p. 285, Abstract 89:184615w (1978).

"Glass for Making Glass Fiber," Grigor'ev, V.S., et al., *Chemical Abstracts*, vol. 81, Abstract 140076b (1974).

"Dissolution Kinetics of Magnesium Silicates," Luce, R.W., et al., *Geochimica et Cosmochimica Acta.*, vol. 36, pp. 35-50 (1972).

"Solubility of Fibres In Vitro and in Vivo," J.P. Leineweber, Proceedings of 1982 WHO IARC Conference, Copenhagan, vol. 2:87-101 (1988).

"Elements of Ceramics," Norton, F.H., (Addison-Wesley Publishing Co., Inc. Reading, Massachusetts. p. 39 (1952).

Carlock, D.E., "Ceramic Fibres," *Refractories Journal*, 58:17-20 (1983).

Dietrichs & Kronert, *Gas Warme International*, vol. 30, Issue No. 7/8 (Jul./Aug. 1981).

Ofentechnik Stahl & Eisen, "Furnace technology . . . Heat and Energy." 110(6):115 (Jun. 1990).

Keramishe Zeitschriften, 33(9):516 (1981).

Extract from ENV 1094, Part 7, section 7, 9-12 (1993).

Database WPIL Section Ch. Week 8218, 82-36551E (equivalent to JP-B-57016938 (undated).

"Multicomponent Silicate Glasses," *Molecular Structure*, pp. 28-31 (undated).

Thermal Ceramics Product Information for Superwool® Blanket, 2 pages, Mar. 1991.

Thermal Ceramics Brochure entitled "Innovative Solutions for Heat-Intensive Problems,", SF 607™ Blanket, SF 607™ Board, SF 607™ Paper (Apr. 1992), 7 pages.

Carborundum Product Information Brochure for Insulfrax® Blanket, 2 pages (Apr. 1993).

WPI Abstract Accession No. 93-285586 and JP5202352 (Aug. 10, 1993).

WPI Abstract Accession No. 87-154127 and JP62091545 (Apr. 27, 1987).

WPI Abstract Accession No. 81-26226D and JP56016578 (Feb. 17, 1981).

Insulcon Technical Datasheet entitled "Refractory Fiber Products" (seven pages, Nov. 1992).

Klinger, et al., "Recent developments in high-temperature heat-insulating materials of ceramic fibre," Conference Proceedings from 7th Duisburger Warmedammtagen (Thermal Insulation Conference) Mar. 12, 13, 1997 (pp. 1-13) and its English translation.

Guyadec and Persson, "Inorganic Binders for High Temperatures Vacuum Forming of Ceramic Fibres," *Universite Joseph Fourier*, Grenoble, France, 1992 Eka Nobel AB (pp. 1-29).

Applications of Nalco® Colloidal Silicas, Nalco Chemical Company, May 1994, one page.

Brochure from Akzo-PQ Silica Amersfoort, Netherlands, 1993 (pp. 4 and 5) and its English translation.

Safety Data Sheet "Carbowool HT Products," by Carborundum Deutschland GmbH, May 28, 1998 (pp. 1-9) and its English translation.

Extract from two volume Brockhaus ABC Chemie, vol. 1 A-K, p. 672, 1971 relating to term Silica gel, Gelatinous silica and its English translation.

Cass, Richard B., *Fabrication of Continuous Ceramic Fiber by the Viscous Suspension Spinning Process*, Ceramic Bulletin, vol. 70, No. 3, 1981.

Waller, David, *Poling of Lead Zirconate Titanate Ceramics and Flexible Piezoelectric Composites by the Corona Discharge Technique, J. Am. Ceramic Society*, 72 [2] 322-24 (1989).

Selfridge, Alan R. *Approximate Material Properties in Isotropic Materials*, IEEE Transactions on Sonics and Ultrasonics, vol. SU-32 No. 3, May 1985 pp. 381-395.

Hayashi, Kunio et al., "Densification of Compacted Magnesium Alumino-Silicate Glass Powders," *Journal of the Ceramic Society of Japan, Int. Edition*, vol. 98-1077.

Shyu, Jiin-Jyh and Wu, Jenn-Ming, "Effect of $TiO_2$ addition on the nucleation of apatite in an $MgO$-$Cao$-$SiO_2$-$P_2O_5$ glass," *Journal of Materials Science Letters*, 1999, vol. 10, pp. 1056-1058.

Vogel, Werner and Höland, Wolfram, "Nucleation and crystallization kinetics of an $MgO$-$Al_2O_3$-$SiO_2$ base glass with various dopants," pp. 125-145.

Wallenberger, Frederick T. et al., "Inviscid Melt Spinning of Alumina Fibers: Chemical Jet Stabilization," *Journal of the American Ceramic Society*, 1992, vol. 75, No. 3.

Alexander, Iain C. and Jubb, Gary A., "Development of a soluble high-temperature insulation fibre," *Glastech. Ber. Glass Sci. Technol.*, 1997, vol. 70, No. 12.

Maier, V. and Müller, G., "Nucleation and crystallization in Mg-Al-silicate-glass-ceramics," *cfi/Ber.*, 1988, vol. 65, No. 6/7, pp. 208-212.

* cited by examiner

SALINE SOLUBLE INORGANIC FIBRES

CROSS REFERENCE TO RELATED APPLICATIONS

This patent application is a continuation application based on and claiming priority on U.S. patent application Ser. No. 10/493,340 filed on Apr. 22, 2004, now U.S. Pat. No. 7,470,641 which is the U.S. national phase of International Application No. PCT/GB03/0003 filed on Jan. 2, 2003 and published in English as International Publication No. WO 03/059835 A1 on Jul. 24, 2003, which application claims priority to Great Britain Application No. 0200162.6 filed on Jan. 4, 2002, now British Patent 238793, the contents of which are incorporated by reference herein.

INTRODUCTION AND BACKGROUND

This invention relates to saline soluble, non-metallic, amorphous, inorganic oxide, refractory fibrous materials. The invention particularly relates to glassy fibres having silica as their principal constituent.

Inorganic fibrous materials are well known and widely used for many purposes (e.g. as thermal or acoustic insulation in bulk, mat, or blanket form, as vacuum formed shapes, as vacuum formed boards and papers, and as ropes, yarns or textiles; as a reinforcing fibre for building materials; as a constituent of brake blocks for vehicles). In most of these applications the properties for which inorganic fibrous materials are used require resistance to heat, and often resistance to aggressive chemical environments.

Inorganic fibrous materials can be either glassy or crystalline. Asbestos is an inorganic fibrous material one form of which has been strongly implicated in respiratory disease.

It is still not clear what the causative mechanism is that relates some asbestos with disease but some researchers believe that the mechanism is mechanical and size related. Asbestos of a critical size can pierce cells in the body and so, through long and repeated cell injury, have a bad effect on health. Whether this mechanism is true or not regulatory agencies have indicated a desire to categorise any inorganic fibre product that has a respiratory fraction as hazardous, regardless of whether there is any evidence to support such categorisation. Unfortunately for many of the applications for which inorganic fibres are used, there are no realistic substitutes.

Accordingly there is a demand for inorganic fibres that will pose as little risk as possible (if any) and for which there are objective grounds to believe them safe.

A line of study has proposed that if inorganic fibres were made that were sufficiently soluble in physiological fluids that their residence time in the human body was short; then damage would not occur or at least be minimised. As the risk of asbestos linked disease appears to depend very much on the length of exposure this idea appears reasonable. Asbestos is extremely insoluble.

As intercellular fluid is saline in nature the importance of fibre solubility in saline solution has long been recognised. If fibres are soluble in physiological saline solution then, provided the dissolved components are not toxic, the fibres should be safer than fibres which are not so soluble. The shorter the time a fibre is resident in the body the less damage it can do. H. Förster in 'The behaviour of mineral fibres in physiological solutions' (*Proceedings of* 1982 *WHO IARC Conference*, Copenhagen, Volume 2, pages 27-55 (1988)) discussed the behaviour of commercially produced mineral fibres in physiological saline solutions. Fibres of widely varying solubility were discussed.

International Patent Application No. WO87/05007 disclosed that fibres comprising magnesia, silica, calcia and less than 10 wt % alumina are soluble in saline solution. The solubilities of the fibres disclosed were in terms of parts per million of silicon (extracted from the silica containing material of the fibre) present in a saline solution after 5 hours of exposure. The highest value revealed in the examples had a silicon level of 67 ppm. In contrast, and adjusted to the same regime of measurement, the highest level disclosed in the Förster paper was equivalent to approximately 1 ppm. Conversely if the highest value revealed in the International Patent Application was converted to the same measurement regime as the Förster paper it would have an extraction rate of 901,500 mg Si/kg fibre—i.e. some 69 times higher than any of the fibres Förster tested, and the fibres that had the highest extraction rate in the Förster test were glass fibres which had high alkali contents and so would have a low melting point. This is convincingly better performance even taking into account factors such as differences in test solutions and duration of experiment.

International Patent Application No. WO89/12032 disclosed additional fibres soluble in saline solution and discusses some of the constituents that may be present in such fibres.

European Patent Application No. 0399320 disclosed glass fibres having a high physiological solubility.

Further patent specifications disclosing selection of fibres for their saline solubility include for example European 0412878 and 0459897, French 2662687 and 2662688, PCT WO86/04807, WO90/02713, WO92/09536, WO93/22251, WO94/15883, WO97/16386 and U.S. Pat. No. 5,250,488.

The refractoriness of the fibres disclosed in these various prior art documents varies considerably and for these alkaline earth silicate materials the properties are critically dependent upon composition.

WO94/15883 disclosed a number of fibres that are usable as refractory insulation at temperatures of up to 1260° C. or more. These fibres comprised CaO, MgO, $SiO_2$, and optionally $ZrO_2$ as principal constituents. Such fibres are frequently known as CMS (calcium magnesium silicate) or CMZS ((calcium magnesium zirconium silicate) fibres. WO94/15883 required that any alumina present only be in small quantities.

A drawback found in use of these fibres, is that at temperatures between about 1300° C. and 1350° C. the fibres undergo a considerable increase in shrinkage. Typically, shrinkages increase from about 1-3% at 1200° C.; to, say, 5% or more at 1300° C.; to >20% at 1350° C. This means that, for example, a temperature overrun on a furnace can result in damage to the insulation and hence to the furnace itself.

A further drawback is that calcium magnesium silicate fibres can react with, and stick to, alumina containing materials due to formation of a eutectic composition. Since aluminosilicate materials are widely used this is a major problem.

WO97/16386 disclosed fibres that are usable as refractory insulation at temperatures of up to 1260° C. or more. These fibres comprised MgO, $SiO_2$, and optionally $ZrO_2$ as principal constituents. As with WO94/15883, this patent required that any alumina present only be in small quantities.

While these fibres do not show the dramatic change in shrinkage evident in the fibres of WO94/15883, they do show a significantly higher shrinkage at normal use temperatures typically having a shrinkage of 3-6% over the range 1200° C.-1450° C. These fibres do not appear to have the drawback of reacting with and sticking to alumina containing materials, however they tend to be difficult to make.

SUMMARY OF INVENTION

The applicants have invented a group of fibres that have a lower shrinkage across a range of temperatures than the fibres of WO97/16386, while having a higher onset of increase in shrinkage, and a more gentle change in shrinkage, than the fibres of WO94/15883 and which also have a reduced tendency to react with and stick to alumina.

Accordingly, the present invention provides thermal insulation for use in applications requiring continuous resistance to temperatures of 1260° C. without reaction with aluminosilicate firebricks, the insulation comprising fibres having a composition in wt %

$65\% < SiO_2 < 86\%$ $MgO < 10\%$ $14\% < CaO < 28\%$ $Al_2O_3 < 2\%$ $ZrO_2 < 3\%$ $B_2O_3 < 5\%$ $P_2O_5 < 5\%$ $72\% < SiO_2 + ZrO_2 + B_2O_3 + 5*P_2O_5$ $95\% < SiO_2 + CaO + MgO + Al_2O_3 + ZrO_2 + B_2O_3 + P_2O_5$.

A preferred range of compositions is:—

$72\% < SiO_2 < 80\%$ $18\% < CaO < 26\%$ $0\% < MgO < 3\%$ $0\% < Al_2O_3 < 1\%$ $0\% < ZrO_2 < 1.5\%$ $98.5\% < SiO_2 + CaO + MgO + Al_2O_3 + ZrO_2 + B_2O_3 + P_2O_5$.

A still more preferred range has the composition:—

$72\% < SiO_2 < 74\%$ $24\% < CaO < 26\%$

Additionally, the applicants have found that addition of small amounts of lanthanide elements, particularly lanthanum, improves the quality of the fibres, particularly their length and thickness, such that improved strength results. There is a trade-off in terms of slightly lower solubility, but the improved strength is of help, particularly in making such products as blankets, in which the fibres are needled to form an interlocking web of fibres.

Accordingly, the present invention comprises a silicate fibre comprising:—

$65\% < SiO_2 < 86\%$ $MgO < 10\%$ $14\% < CaO < 28\%$ $Al_2O_3 < 2\%$ $ZrO_2 < 3\%$ $B_2O_3 < 5\%$ $P_2O_5 < 5\%$ $72\% < SiO_2 + ZrO_2 + B_2O_3 + 5*P_2O_5$ $95\% < SiO_2 + CaO + MgO + Al_2O_3 + ZrO_2 + B_2O_3 + P_2O_5$.

$0.1\% < R_2O_3 < 4\%$ where R is selected from the group Sc, La, Ce, Pr, Nd, Sm, Eu, Gd, Tb, Dy, Ho, Er, Tm, Yb, Lu, Y or mixtures thereof.

The preferred elements are La and Y. Preferably, to achieve significant improvements in fibre quality, the amount of $R_2O_3$ is greater than 0.25%, more preferably >0.5%, and still more preferably >1.0%. To minimise the reduction is solubility that occurs, the amount of $R_2O_3$ is preferably <2.5%, still more preferably <1.5% by weight. Very good results are obtained for a fibre having the composition in wt %:—

$SiO_2$:—73±0.5%

CaO:—24±0.5%

$La_2O_3$:—1.3–1.5%

Remaining components:—<2%, preferably <1.5%

BRIEF DESCRIPTION OF DRAWING

Further features of the invention will become apparent from the claims in the light of the following illustrative description and with reference to the drawing FIG. 1 which is a graph of shrinkage against temperature of some fibres according to the present invention in comparison with some commercial fibres.

DETAILED DESCRIPTION OF INVENTION

Figure 1:
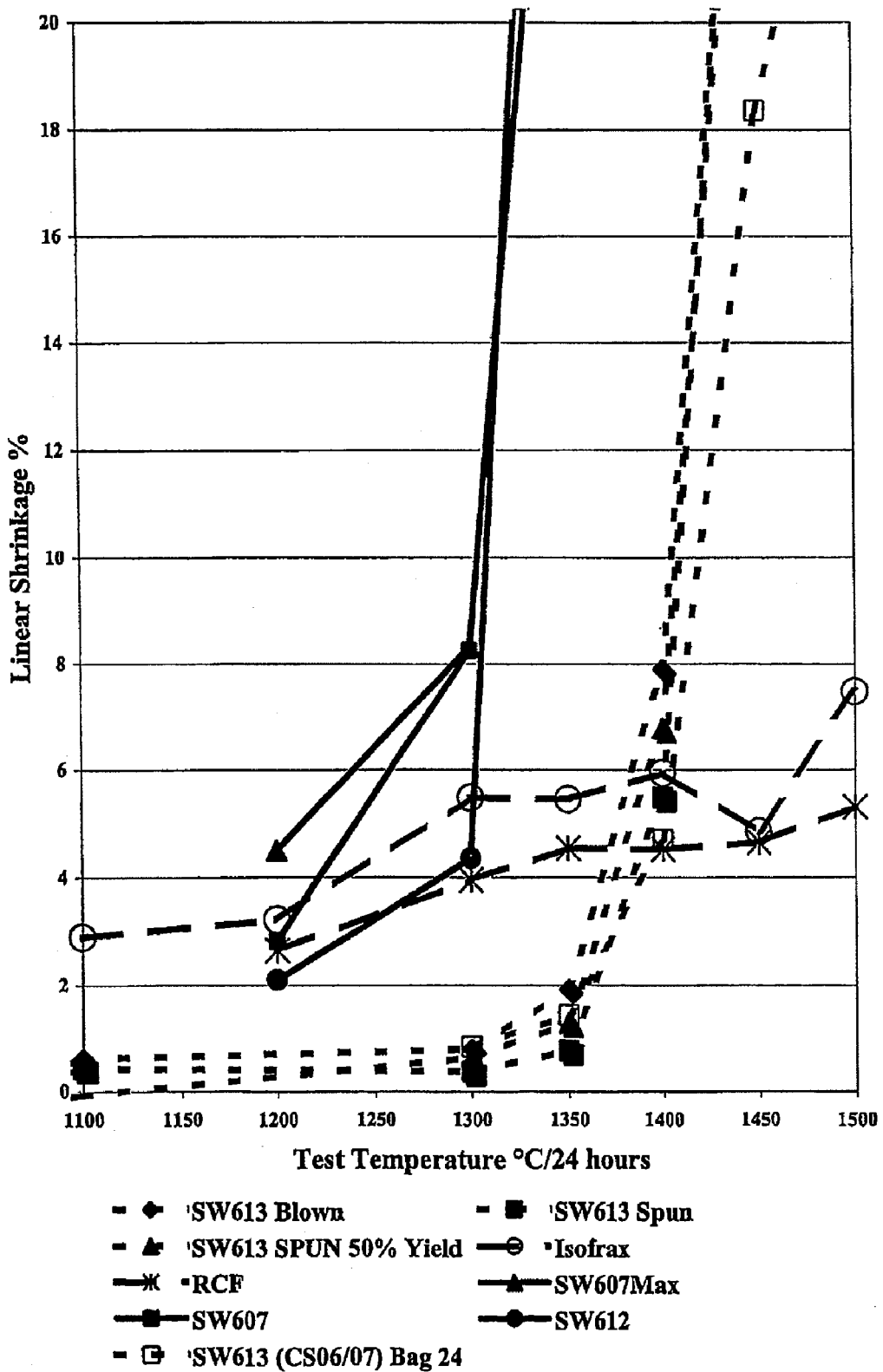

The inventors produced a range of calcium silicate fibres using an experimental rig in which a melt was formed of appropriate composition, tapped through a 8-16 mm orifice, and blown to produce fibre in a known manner. (The size of the tap hole was varied to cater for the viscosity of the melt— this is an adjustment that must be determined experimentally according to the apparatus and composition used).

The fibres were tested and the results for fibres that are predominantly calcium silicate fibres with some MgO are shown in Table 1, in which:— shrinkage figures are shown as measured on a preform of fibre by the method (see below), compositions are shown as measured by x-ray fluorescence with boron by wet chemical analysis, total solubility in ppm of the major glass components after a 24 hour static test in a physiological saline solution is shown, specific surface area in $m^2$ g, a qualitative assessment of fibre quality, and an indication of whether the preform stuck to an aluminosilicate brick (JM 28 bricks obtainable from Thermal Ceramics Italiana and having an approximate composition 70 wt % alumina and 30 wt % silica)

The shrinkage was measured by the method of manufacturing vacuum cast preforms, using 75 g of fibre in 500 $cm^3$ of 0.2% starch solution, into a 120×65 mm tool. Platinum pins (approximately 0.1-0.3 mm diameter) were placed 100×45 mm apart in the 4 corners. The longest lengths (L1 & L2) and the diagonals (L3 & L4) were measured to an accuracy of ±5 m using a travelling microscope. The samples were placed in a furnace and ramped to a temperature 50° C. below the test temperature at 300° C./hour and ramped at 120° C./hour for the last 50° C. to test temperature and left for 24 hours. On removal from the furnace the samples were allowed to cool naturally. The shrinkage values are given as an average of the 4 measurements.

The inventors found that those fibres having a silica content less than 72% by weight tended to stick to the aluminosilicate brick. They also found that high MgO content fibres (>12%) did not stick (as predicted from the properties of WO97/16386).

It is known that calcium silicate fibres having an intermediate level of MgO (12-20%) stick to aluminosilicate brick, whereas magnesium silicate fibres do not. Surprisingly, for the fibres of the present invention, such intermediate levels of MgO can be tolerated. Levels of <10% MgO, or <5% MgO give the non-sticking results required, but it appears preferable for refractoriness to have a maximum level of MgO at 2.5% by weight, and more preferably the amount should be below 1.75% by weight.

Table 2 shows the effect of alumina and zirconia on these fibres. Alumina is known to be detrimental to fibre quality and the first three compositions of Table 2 have over 2% $Al_2O_3$ and stick to aluminosilicate brick. Additionally, increased alumina leads to lowered solubility. Accordingly, the inventors have determined 2% as the upper limit for alumina in their inventive compositions.

In contrast zirconia is known to improve refractoriness and Table 2 shows that silica levels of below 72% can be tolerated if the amount of $ZrO_2$ is sufficient that the sum of $SiO_2$ and $ZrO_2$ is greater than 72% by weight. However, increasing zirconia lowers the solubility of the fibres in physiological saline solution and so the preferred level of $ZrO_2$ is less than 3%.

The effect of some other common glass additives is indicated by Table 3, which shows the effect of $P_2O_5$ and $B_2O_3$ as glass forming additives. It can be seen that $P_2O_5$ has a disproportionate effect on the sticking properties of these compositions, as fibres with as low as 67.7% $SiO_2$ do not stick to aluminosilicate brick.

$B_2O_3$ also has an effect with fibres having as low as 70.9% $SiO_2$ not sticking. The inventors have determined that sticking to aluminosilicate brick tends not to occur for fibres meeting the relationship:—

$$72\% < SiO_2 + B_2O_3 + ZrO_2 + 5*P_2O_5.$$

The inventors have assumed a maximum level for $B_2O_3$ and $P_2O_5$ of 5% by weight each.

Tables 1 to 3 show that minor amounts of other components may be included and the invention tolerates up to 5% of other ingredients, but preferably these other ingredients amount to less than 2%, more preferably less than 1%, since such other ingredients tend to make the fibres less refractory. (But see below for effect of specific lanthanide additives).

The above results were obtained on an experimental rig, with all of the uncertainties that entails. Production trials of the most favourable appearing fibres were conducted on two separate sites to allow both blowing and spinning of the compositions to be tried. Table 4 shows a selection of the results obtained (duplicates omitted) and shows that a very usable fibre results. The fibres tested in the production trials had compositions falling in the approximate range $72\% < SiO_2 < 80\%$ $18\% < CaO < 26\%$ $0\% < MgO < 3\%$ $0\% < Al_2O_3 < 1\%$ $0\% < ZrO_2 < 1.5\%$ with with $98.5\% < SiO_2 + CaO + MgO + Al_2O_3 + ZrO_2 + B_2O_3 + P_2O_5$.

It can be seen that the compositions with an MgO level of greater than 1.75% tended to have a higher shrinkage at 1350° C. than those with a lower MgO level.

FIG. 1 shows in graphical form an important feature of the fibres of the invention and compares the shrinkage characteristics of the first three fibres and $5^{th}$ fibres of Table 4 (each referred to as SW613) with commercial fibres Isofrax® (a magnesium silicate fibre from Unifrax Corporation), RCF (a standard aluminosilicate refractory ceramic fibre), and SW607 Max™, SW607™, and SW612™ (calcium magnesium silicate fibres from Thermal Ceramics Europe Limited).

It can be seen that Isofrax® and RCF have a shrinkage that is in the range 3-6% over the range 1200 to 1450° C. SW607 Max™, SW607™, and SW612™ have shrinkages in the range 2-5% at 1200° C. but increase rapidly after 1300° C. The fibres of the present invention have a shrinkage of less than 2% up to 1350° C., drift up to 5-8% at 1400° C. and accelerate thereafter.

The fibres of the present invention therefore have the advantage of a lower shrinkage than magnesium silicate, commercial calcium magnesium silicate, or RCF fibres at 1300° C.; commence their increase in shrinkage at a higher temperature than commercial calcium magnesium silicate fibres; have a shallower rise in shrinkage with temperature than commercial calcium magnesium silicate fibres; and do not stick to aluminosilicate brick in the way commercial calcium magnesium silicate fibres may.

The fibres can be used in thermal insulation and may form either a constituent of the insulation (e.g. with other fibres and/or fillers and/or binders) or may form the whole of the insulation. The fibres may be formed into blanket form insulation.

A problem found with the plain calcium silicate fibres described above was that the fibres tend to be short resulting in a poor quality blanket. A means of producing better fibre for blanket was required and the applicants conducted screening tests to investigate the effect on fibre quality of the addition of other elements as additives to the composition. It was found that lanthanide elements, particularly La and Y improved fibre quality. La was determined to be the most commercially interesting element and so after this initial screening test efforts centred on investigating the effect of La.

$La_2O_3$ was used as an additive in amounts of 0-4% to a fibre comprising 73.5% $SiO_2$ and balance CaO and minor impurities to determine the optimum amount. It was determined that addition of $La_2O_3$ improved fiberisation while not reducing refractoriness. The fibres did not react with alumina bricks. However, at the highest levels of $La_2O_3$ the solubility was reduced significantly. Accordingly a compromise level of 1.3-1.5% $La_2O_3$ was used for further tests on the fibre composition.

To check and define the optimum formulation in terms of refractoriness and fiberisation for the lanthanum containing material, a study was performed looking to the increase of silica from 67% to 78% $SiO_2$ in a material containing 1.3% $La_2O_3$ (kept constant), balance CaO+minor impurities MgO and $Al_2O_3$.

Increasing silica increases the refractoriness of the fibre, giving lower shrinkage, higher melting point and decreases reaction with alumina at high temperature.

The best compromise between refractoriness and fiberisation was found for a composition of:

| | |
|---|---|
| SiO$_2$ | 73% |
| CaO | 24% |
| La$_2$O$_3$ | 1.3-1.5% |
| Remaining impurities (Al$_2$O$_3$, MgO, others) | <1.5% |

This composition was tried on production scale manufacturing blanket having the composition "With La" shown in Table 4 below.

It was confirmed that this composition produced better fibres than an La free version ("No La" in Table 4). The fibres still not reacting with alumina brick, and having good refractoriness.

Better fiberisation was observed and evaluated by looking to the tensile strength of 25 mm thick blanket having a density 128 kg/m$^3$.

TABLE 4

| OXIDES | No La | With La |
|---|---|---|
| Na$_2$O | <0.05 | 0.18 |
| MgO | 0.89 | 0.46 |
| Al$_2$O$_3$ | 0.64 | 0.66 |
| SiO$_2$ | 72.9 | 73.2 |
| K$_2$O | <0.05 | 0.08 |
| CaO | 25.5 | 23.6 |
| Fe$_2$O$_3$ | 0.11 | 0.14 |
| La$_2$O$_3$ | 0 | 1.3 |
| LOI 1025° C. | 0.08 | 0.09 |
| Total | 100.1 | 99.7 |
| Tensile strength 128-25 blanket (kPa) | 25-30 | 35-60 |

It can be seen that the addition of only 1.3% La$_2$O$_3$ results in a considerable improvement in tensile strength, indicating a much improved fibre.

The applicants surmise that this effect of improving fiberisation is a viscosity or surface tension modifying effect applicable generally to alkaline earth silicate fibres, and so the invention encompasses the use of such additives generally in the amounts indicated above to improve fiberisation of alkaline earth silicate fibres.

TABLE 1

| | Shrinkage %/24 hrs | | | | | | Composition (wt %) | | | | | |
|---|---|---|---|---|---|---|---|---|---|---|---|---|
| Comp. | 1300° c. | 1350° c. | 1400° c. | 1450° c. | 1500° c. | 1550° c. | CaO | SiO$_2$ | PA | Al$_2$O$_3$ | B$_2$O$_3$ | ZrO$_2$ |
| CS01/C | | 10.34 | melted | melted | | | 35.00 | 62.40 | | 0.83 | | |
| CS02/C | | 8.52 | melted | melted | | | 33.00 | 63.80 | | 0.77 | | |
| CS01/D | | 5.14 | | | | | 32.90 | 64.60 | | 0.80 | | |
| CS01 | 2.60 | 4.34 | melted | | | | 33.80 | 65.00 | | 0.80 | | |
| CS10 | | 4.25 | 19.51 | melted | | | 33.00 | 65.40 | | 0.76 | | |
| CS10 cons | | 4.25 | 14.12 | melted | | | 33.00 | 65.40 | | 0.76 | | |
| CS02 | 1.92 | 2.58 | 7.83 | melted | | | 31.90 | 66.50 | | 0.77 | | |
| CS02/D | | 3.85 | | | | | 31.20 | 66.60 | | 0.75 | | |
| CMS02 | 2.12 | melted | | | | | 18.30 | 66.90 | | 0.31 | | |
| CMS02/B | 2.35 | 7.02 | melted | | | | 18.30 | 66.90 | | 0.31 | | |
| CS03/D | | 11.87 | | | | | 28.90 | 69.30 | | 0.70 | | |
| CMS03 | 2.95 | melted | | | | | 16.80 | 69.40 | | 0.30 | | |
| CMS03/B | 2.75 | 8.08 | melted | | | | 16.80 | 69.40 | | 0.30 | | |
| CS15 | | | 5.67 | 34.47 | 34.02 | | 28.00 | 69.70 | | 0.61 | | |
| CS04/E | | 2.77 | 11.39 | 21.96 | | | 28.20 | 69.80 | | 0.61 | | |
| CS04/E cons | | 2.77 | 7.62 | | | | 28.20 | 69.80 | | 0.61 | | |
| CS04 | 1.65 | 0.98 | 3.71 | 30.42 | | | 28.20 | 69.80 | | 0.61 | | |
| CMS04 | 2.35 | melted | | | | | 16.50 | 70.00 | | 0.38 | | |
| CS12 | | 2.35 | 9.10 | 31.40 | | | 26.90 | 70.70 | | 0.66 | | |
| CS12 cons | | 2.35 | 4.80 | 15.37 | | | 26.90 | 70.70 | | 0.66 | | |
| CS16 | | | 9.37 | 35.35 | 34.37 | | 27.20 | 71.00 | | 0.61 | | |
| CS17 | | | 9.05 | 33.70 | 30.64 | | 26.60 | 71.40 | | 0.62 | | |
| CS18 | | | 7.92 | 32.00 | 30.02 | | 26.20 | 71.60 | | 0.75 | | |
| CS19 | | | 4.84 | 27.36 | 26.41 | | 26.40 | 71.60 | | 0.73 | | |
| CMS05 | 2.63 | melted | | | | | 15.10 | 72.00 | | 0.97 | | |
| CMS05/B | 3.31 | 8.11 | 14.10 | | | | 15.10 | 72.00 | | 0.97 | | |
| SACM01 | | 4.01 | 3.56 | 4.79 | | | 3.17 | 78.00 | | 1.60 | | |
| SACM02 | | 3.51 | | | | | 5.04 | 76.50 | | 1.62 | | |
| SACM03 | | 5.46 | 8.63 | 10.38 | | | 7.71 | 75.80 | | 1.77 | | |
| CSMg01 | | 7.36 | 21.14 | 28.33 | 37.44 | | 23.60 | 72.90 | | 0.61 | | |
| CSMg03 | | 2.24 | 7.17 | 12.61 | | | 20.20 | 75.70 | | 0.57 | | |
| CSMg02 | | 7.14 | 12.13 | 16.17 | 27.03 | | 21.60 | 75.20 | | 0.54 | | |
| CSMg07 | | 7.38 | 20.47 | | | | 23.00 | 73.80 | | 0.49 | | |
| CSMg06 | | 6.23 | 25.18 | 12.34 | 29.97 | | 24.20 | 72.30 | | 0.51 | | |
| CSMg09 | | 1.28 | 2.33 | | | | 18.30 | 78.40 | | 0.39 | | |
| CSMg08 | | 2.86 | 8.24 | 9.70 | 31.43 | | 20.50 | 76.50 | | 0.44 | | |
| CSMg10 | | 1.85 | 1.80 | | | | 17.30 | 79.40 | | 0.28 | | |
| CS Fe$_2$O$_3$ 01 | | 1.94 | 8.72 | 19.79 | 26.24 | | 22.60 | 74.40 | | 0.57 | | |
| CS Fe$_2$O$_3$ 05 | | 3.47 | 10.11 | 15.34 | 22.52 | | 21.10 | 74.70 | | 0.58 | | |
| CS Fe$_2$O$_3$ 02 | | 1.43 | 3.64 | | | | 21.90 | 74.80 | | 0.56 | | |
| CS Al 03 | | 2.18 | 8.47 | 15.15 | 22.38 | | 22.30 | 74.60 | | 1.03 | | |
| CS13 | | 1.46 | 3.00 | 23.16 | | | 24.00 | 74.30 | | 0.55 | | |

TABLE 1-continued

| | | | | | | | | | |
|---|---|---|---|---|---|---|---|---|---|
| CS Fe₂O₃ 04 | | 1.79 | 9.03 | 14.51 | 19.78 | | 21.60 | 74.90 | 0.52 |
| CS Fe₂O₃ 03 | | 2.43 | 12.43 | 20.53 | 24.24 | | 21.90 | 74.70 | 0.52 |
| CS05 | 1.21 | 1.79 | 4.14 | melted | | | 26.40 | 72.20 | 0.55 |
| CS06/E | | 1.56 | 6.03 | 21.81 | 30.16 | | 24.00 | 73.90 | 0.52 |
| CS06/E cons | | 1.56 | 4.02 | 10.54 | 13.75 | 16.96 | 24.00 | 73.90 | 0.52 |
| CS Al 02 | | 1.48 | 2.41 | 13.51 | 18.28 | | 23.10 | 74.70 | 0.48 |
| CS07/E | | 1.50 | 2.14 | 10.00 | 5.19 | 5.81 | 22.20 | 76.50 | 0.53 |
| CS14/B | | 2.22 | 6.23 | | | | 22.60 | 75.00 | 0.58 |
| CS08/E | | 2.03 | 1.34 | 3.10 | 7.72 | | 19.50 | 78.90 | 0.70 |
| CS06/B | | | 2.66 | melted | 12.00 | | 24.30 | 75.00 | 0.39 |

| | Composition (wt %) | | | | | | Total Solubility | SSA | | JM 28 |
|---|---|---|---|---|---|---|---|---|---|---|
| Comp. | MgO | Na₂O | K₂O | TiO₂ | Fe₂O₃ | ZnO | ppm | m²/g | Fiber Quality | sticking |
| CS01/C | 0.56 | 0.30 | 0.15 | | 0.24 | | 230.0 | 0.33 | Coarse | Stuck |
| CS02/C | 0.51 | 0.40 | 0.14 | | 0.22 | | 199.0 | 0.45 | Coarse | Stuck |
| CS01/D | 0.48 | 0.26 | 0.15 | | 0.18 | | 199.1 | 0.37 | Coarse | Stuck |
| CS01 | 0.51 | 0.21 | | | 0.21 | | 235.0 | 0.47 | Coarse | Stuck |
| CS10 | 0.52 | 0.24 | 0.15 | | 0.21 | | 199.8 | 0.30 | Coarse | Stuck |
| CS10 cons | 0.52 | 0.24 | 0.15 | | 0.21 | | 199.8 | 0.30 | Coarse | Stuck |
| CS02 | 0.49 | 0.31 | | | 0.20 | | 218.0 | 0.59 | Coarse | Stuck |
| CS02/D | 0.46 | 0.25 | 0.14 | | 0.20 | | 208.1 | 0.42 | Coarse | Stuck |
| CMS02 | 14.40 | 0.17 | | | 0.14 | | 213.2 | 0.42 | Coarse | Stuck |
| CMS02/B | 14.40 | 0.17 | | | 0.14 | | | | Coarse | Stuck |
| CS03/D | 0.44 | | | | 0.19 | | 215.0 | 0.54 | Coarse | Stuck |
| CMS03 | 13.40 | 0.11 | | | 0.14 | | 280.1 | | Coarse | Stuck |
| CMS03/B | 13.40 | 0.11 | | | 0.14 | | | | Coarse | Stuck |
| CS15 | 0.53 | 0.19 | | | 0.20 | | 241.9 | 0.41 | Good fiber | Stuck |
| CS04/E | 0.38 | 0.43 | 0.10 | | 0.17 | | 260.0 | 0.50 | Lots of flake | Stuck |
| CS04/E cons | 0.38 | 0.43 | 0.10 | | 0.17 | | 260.0 | 0.50 | Lots of flake | Stuck |
| CS04 | 0.38 | 0.43 | 0.10 | | 0.17 | | 269.8 | 0.44 | Lots of flake | Stuck |
| CMS04 | 13.10 | 0.12 | | | 0.13 | | | | Coarse | Stuck |
| CS12 | 0.41 | 0.39 | 0.12 | | 0.18 | | 211.3 | 0.55 | Good fiber | Stuck |
| CS12 cons | 0.41 | 0.39 | 0.12 | | 0.18 | | 211.3 | 0.55 | Good fiber | Stuck |
| CS16 | 0.49 | 0.16 | | | 0.17 | | 283.1 | 0.55 | Good fiber | Stuck |
| CS17 | 0.48 | 0.17 | | | 0.17 | | 228.2 | 0.71 | Good fiber | Stuck |
| CS18 | 0.49 | 0.20 | | | 0.18 | | 248.8 | 0.71 | Good fiber | Stuck |
| CS19 | 0.48 | 0.21 | | | 0.19 | | 248.2 | 0.63 | Good fiber | Stuck |
| CMS05 | 11.40 | 0.23 | | | 0.12 | | 125.2 | | Coarse | Stuck |
| CMS05/B | 11.40 | 0.23 | | | 0.12 | | | | Coarse | Stuck |
| SACM01 | 17.00 | | | | 0.21 | | 160.0 | 0.37 | O.K fiber | Not Stuck |
| SACM02 | 14.80 | 0.12 | | | 0.20 | | 206.3 | 0.33 | O.K fiber | Not Stuck |
| SACM03 | 13.10 | | | | 0.65 | | 170.5 | 0.46 | O.K fiber | Not Stuck |
| CSMg01 | 2.61 | 0.11 | | | 0.16 | | 223.6 | 0.66 | Good fiber some shot | Stuck |
| CSMg03 | 2.61 | 0.20 | | | 0.18 | | 231.3 | 0.38 | Good fiber some shot | Not Stuck |
| CSMg02 | 2.59 | | | | 0.14 | | 210.6 | 0.63 | Good fiber some shot | Stuck |
| CSMg07 | 1.81 | | | | 0.17 | | 250.1 | 0.42 | O.k fiber | Not Stuck |
| CSMg06 | 1.79 | 0.13 | | | 0.18 | | 268.1 | 0.53 | Good fiber | Not Stuck |
| CSMg09 | 1.71 | | | | 0.14 | | 228.7 | 0.35 | Shotty | Not Stuck |
| CSMg08 | 1.65 | | | | 0.16 | | 257.2 | 0.43 | Good fiber | Not Stuck |
| CSMg10 | 1.61 | | | | 0.15 | | 248.3 | 0.22 | Coarse shotty | Not Stuck |
| CS Fe₂O₃ 01 | 0.72 | 0.23 | | | 0.44 | | 279.9 | 0.49 | O.k fiber | Not Stuck |
| CS Fe₂O₃ 05 | 0.51 | 0.17 | | | 2.25 | | 207.1 | 0.47 | Shotty | Not Stuck |
| CS Fe₂O₃ 02 | 0.50 | 0.22 | | | 0.65 | | 285.5 | 0.30 | Shotty | Not Stuck |
| CS Al 03 | 0.41 | 0.18 | | | 0.15 | | | 0.48 | Good fiber | Not Stuck |
| CS13 | 0.39 | 0.17 | | | 0.17 | | 156.0 | 0.56 | Shotty | Not Stuck |
| CS Fe₂O₃ 04 | 0.39 | 0.16 | | | 1.47 | | 239.7 | 0.41 | Good fiber | Not Stuck |
| CS Fe₂O₃ 03 | 0.38 | 0.21 | | | 1.06 | | 241.0 | 0.47 | Good fiber | Not Stuck |
| CS05 | 0.33 | 0.19 | 0.10 | | 0.16 | | 262.0 | 0.45 | Lots of flake | Not Stuck |
| CS06/E | 0.33 | 0.28 | | | 0.15 | | 222.0 | 0.34 | Lots of flake | Not Stuck |
| CS06/E cons | 0.33 | 0.28 | | | 0.15 | | 222.0 | 0.34 | Lots of flake | Not Stuck |
| CS Al 02 | 0.33 | 0.19 | | | 0.14 | | | 0.59 | Good fiber | Not Stuck |
| CS07/E | 0.33 | 0.11 | | | 0.15 | | 177.9 | 0.29 | O.K fiber | Not stuck |
| CS14/B | 0.30 | 0.12 | | | 0.17 | | 137.3 | 0.55 | Shotty | Not Stuck |
| CS08/E | 0.27 | | | 0.16 | 0.18 | | 160.0 | 0.32 | Coarse | Not Stuck |
| CS06/B | 0.26 | 0.15 | | | 0.12 | | 172.0 | 0.55 | Lots of flake | Not Stuck |

TABLE 2

| Comp. | Shrinkage %/24 hrs | | | | | | Composition (wt %) | | | | | | |
|---|---|---|---|---|---|---|---|---|---|---|---|---|---|
| | 1300° c. | 1350° c. | 1400° c. | 1450° c. | 1500° c. | 1550° c. | CaO | SiO$_2$ | P$_2$O$_5$ | Al$_2$O$_3$ | B$_2$O$_3$ | ZrO$_2$ | MgO |
| CAS01 | | 17.62 | 18.45 | | | | 24.50 | 71.70 | 2.78 | | | 0.45 | 0.28 |
| CAS02 | | 10.19 | 24.18 | | | | 22.60 | 73.50 | 2.52 | | | 0.91 | 0.25 |
| CAS03 | | 5.42 | 14.63 | 14.56 | | | 20.40 | 75.70 | 2.32 | | | 1.05 | 0.23 |
| CS03/C | | 6.02 | melted | melted | | | 31.50 | 65.60 | 0.83 | | | 0.14 | 0.47 |
| CZrS02 | | 15.01 | 31.08 | | | | 27.40 | 65.80 | 0.70 | | | 3.85 | 0.40 |
| CZrs03 | | 7.39 | 30.64 | | | | 25.60 | 68.00 | 0.67 | | | 3.96 | 0.37 |
| CS11 | | 4.96 | 19.95 | 34.81 | | | 29.00 | 68.90 | 0.75 | | | 0.13 | 0.47 |
| CS11 cons | | 4.96 | 11.42 | 22.67 | | | 29.00 | 68.90 | 0.75 | | | 0.13 | 0.47 |
| CZrS07 | | −0.29 | | | | | 17.90 | 74.70 | 0.62 | | | 4.94 | 0.24 |
| CZrS06 | | melted | 7.97 | | | | 19.00 | 74.90 | 0.71 | | | 4.45 | 0.28 |
| CZrS04 | | 2.56 | | | | | 24.50 | 70.60 | 0.72 | | | 3.29 | 0.36 |
| CS13 cons | | 1.46 | 3.56 | 12.88 | 16.60 | 28.58 | 24.30 | 73.30 | 0.57 | | | 0.73 | 0.31 |
| CAS07 | | 4.59 | 10.22 | | | | 24.80 | 73.10 | 1.10 | | | 0.43 | 0.28 |
| CSMg04 | | 1.76 | 2.94 | | | | 16.70 | 79.40 | 0.38 | | | 0.43 | 2.35 |
| CS08 | 1.24 | 1.30 | 1.74 | 3.37 | | | 19.80 | 78.50 | 0.45 | | | 0.34 | 0.25 |
| CS05/B | 0.86 | 1.53 | 5.56 | | | | 26.00 | 72.00 | 0.62 | | | 0.33 | 0.31 |
| CS05/B cons | | 1.53 | 4.52 | 13.46 | | | 26.00 | 72.00 | 0.62 | | | 0.33 | 0.31 |
| CS05/E | | 2.04 | 7.28 | 33.19 | 44.49 | | 26.00 | 72.00 | 0.62 | | | 0.33 | 0.31 |
| CS05/E cons | | 2.04 | 8.19 | 20.34 | 25.44 | 28.00 | 26.00 | 72.00 | 0.62 | | | 0.33 | 0.31 |
| CS06 | 1.36 | 1.42 | 2.36 | 5.87 | melted | | 23.40 | 73.30 | 1.77 | | | 0.27 | 0.32 |
| CSMg05 | | 1.67 | 1.26 | | | | 16.40 | 79.80 | 0.35 | | | 0.14 | 2.46 |
| CS07/B | 0.86 | 1.50 | 2.17 | 10.00 | 15.00 | | 22.20 | 76.60 | 0.52 | | | 0.12 | 0.26 |
| CS07/B cons | | 1.50 | 1.31 | 2.93 | 5.19 | 5.81 | 22.20 | 76.60 | 0.52 | | | 0.12 | 0.26 |
| CS07 | 1.08 | 1.06 | 1.15 | 3.34 | | | 22.30 | 76.90 | 0.35 | | | 0.10 | 0.24 |

| Comp. | Composition (wt %) | | | | | Total Solubility ppm | SSA m$^2$/g | Fiber Quality | JM 28 sticking | Total SiO$_2$ + ZrO$_2$ |
|---|---|---|---|---|---|---|---|---|---|---|
| | Na$_2$O | K$_2$O | TiO$_2$ | Fe$_2$O$_3$ | ZnO | | | | | |
| CAS01 | 0.12 | | | 0.12 | | 30.3 | | Coarse | Stuck | 72.15 |
| CAS02 | 0.11 | | | 0.15 | | 20.1 | | Coarse | Stuck | 74.41 |
| CAS03 | 0.11 | | | 0.12 | | 47.4 | 0.20 | Coarse | Stuck | 76.75 |
| CS03/C | 0.36 | 0.14 | | 0.23 | | 222.0 | 0.31 | Coarse | Stuck | 65.74 |
| CZrS02 | 0.37 | 0.12 | | 0.19 | | 107.2 | 0.39 | Good fiber | Stuck | 69.65 |
| CZrs03 | 0.25 | 0.11 | | 0.21 | | 64.2 | 0.21 | Good fiber | Stuck | 71.96 |
| CS11 | 0.30 | 0.13 | | 0.19 | | 200.5 | 0.50 | Coarse | Stuck | 69.03 |
| CS11 cons | 0.30 | 0.13 | | 0.19 | | 200.5 | 0.50 | Coarse | Stuck | 69.03 |
| CZrS07 | 0.48 | | | 0.17 | | 24.3 | 0.22 | Very shotty | Not Stuck | 79.64 |
| CZrS06 | 0.42 | | | 0.13 | | 42.5 | 0.25 | Coarse | Not Stuck | 79.35 |
| CZrS04 | 0.35 | 0.11 | | 0.17 | | 69.4 | 0.21 | Good fiber | Not Stuck | 73.89 |
| CS13 cons | 0.26 | | | 0.20 | | 156.0 | 0.56 | Shotty | Not Stuck | 74.03 |
| CAS07 | 0.14 | | | 0.14 | | 127.8 | 0.34 | Coarse | Not Stuck | 73.53 |
| CSMg04 | | | | 0.18 | | 243.0 | 0.09 | Coarse shotty | Not Stuck | 79.83 |
| CS08 | 0.16 | | | 0.14 | | 201.5 | 0.20 | Lots of flake | Not stuck | 78.84 |
| CS05/B | 0.22 | | | 0.15 | | 182.0 | 0.34 | Lots of flake | Not Stuck | 72.33 |
| CS05/B cons | 0.22 | | | 0.15 | | 182.0 | 0.34 | Lots of flake | Not Stuck | 72.33 |
| CS05/E | 0.22 | | | 0.15 | | 276.0 | 0.48 | Lots of flake | Not Stuck | 72.33 |
| CS05/E cons | 0.22 | | | 0.15 | | 276.0 | 0.48 | Lots of flake | Not Stuck | 72.33 |
| CS06 | 0.14 | | | 0.14 | | 244.6 | 0.32 | Lots of flake | Not Stuck | 73.57 |
| CSMg05 | | | | 0.13 | | 237.2 | 0.11 | Good fiber some shot | Not Stuck | 79.94 |
| CS07/B | 0.11 | | | 0.12 | | 104.0 | 0.23 | Lots of flake | Not Stuck | 76.72 |
| CS07/B cons | 0.11 | | | 0.12 | | 104.0 | 0.23 | Lots of flake | Not Stuck | 76.72 |
| CS07 | 0.17 | | | 0.11 | | 203.5 | 0.25 | Lots of flake | Not Stuck | 77.00 |

TABLE 3

| Comp. | Shrinkage %/24 hrs | | | | | | Composition (wt %) | | | | | | |
|---|---|---|---|---|---|---|---|---|---|---|---|---|---|
| | 1300° c. | 1350° c. | 1400° c. | 1450° c. | 1500° c. | 1550° c. | CaO | SiO$_2$ | P$_2$O$_5$ | Al$_2$O$_3$ | B$_2$O$_3$ | ZrO$_2$ | MgO |
| CBS04 | | 3.54 | 6.97 | 7.16 | | | 18.00 | 77.90 | | 0.43 | 2.03 | 0.70 | 0.31 |
| CBS03 | | 3.47 | 10.32 | 16.43 | | | 20.40 | 75.20 | | 0.48 | 2.12 | 0.84 | 0.33 |
| CPS02/B | | | 4.02 | | | | 21.40 | 75.00 | 1.54 | 0.48 | | | 0.32 |
| CPS02 | | 0.66 | 0.91 | 0.70 | | | 22.40 | 74.60 | 1.61 | 0.29 | 0.26 | 0.90 | 0.27 |
| CPS02 cons | | 0.66 | 0.25 | −0.21 | | | 22.40 | 74.60 | 1.61 | 0.29 | 0.26 | 0.90 | 0.27 |
| CPS21 | | 3.04 | | | | | 23.00 | 74.10 | 0.42 | 0.61 | | | 0.45 |
| CBS05 | | 4.14 | 9.98 | 14.71 | | | 21.20 | 73.90 | | 0.54 | 3.11 | | 0.32 |
| CPS20 | | 2.48 | 9.10 | | | | 23.80 | 73.80 | 0.38 | 0.66 | | 0.29 | 0.35 |
| CPS20cons | | 2.48 | 6.21 | 11.94 | 17.39 | 20.69 | 23.80 | 73.80 | 0.38 | 0.66 | | 0.29 | 0.35 |
| CPS18/B | | 1.93 | 6.72 | 16.07 | | | 23.90 | 73.20 | 0.87 | 0.59 | | | 0.34 |
| CPS17/B | | 2.39 | 6.36 | | | | 24.70 | 72.80 | 0.88 | 0.65 | | | 0.36 |

TABLE 3-continued

| Comp. | | | | | CaO | SiO₂ | P₂O₅ | Al₂O₃ | B₂O₃ | ZrO₂ | MgO |
|---|---|---|---|---|---|---|---|---|---|---|---|
| CPS01/B | | 1.73 | 8.96 | 12.58 | | 23.50 | 72.70 | 1.58 | 0.58 | | | 0.33 |
| CPS01/C | | 2.05 | 11.86 | 5.87 | 6.10 | 23.80 | 72.60 | 1.58 | 0.46 | | | 0.34 |
| CBS02 | | 4.93 | 18.32 | 23.28 | | 22.90 | 72.60 | | 0.70 | 2.16 | 0.30 | 0.33 |
| CBS07 | | −0.29 | 6.10 | 14.69 | | 24.30 | 72.20 | | 0.38 | 1.38 | 0.84 | 0.27 |
| CPS01 | | 2.29 | 1.25 | 0.15 | | 23.90 | 71.50 | 1.52 | 0.48 | 0.90 | 0.95 | 0.29 |
| CPS01 cons | | 2.29 | 1.25 | 0.15 | | 23.90 | 71.50 | 1.52 | 0.48 | 0.90 | 0.95 | 0.29 |
| CPS17 | | 2.86 | | | | 25.20 | 71.50 | 0.90 | 0.66 | | | 0.37 |
| CPS19 | | 2.87 | 19.23 | 26.90 | | 25.50 | 71.50 | 0.48 | 0.64 | | 0.15 | 0.39 |
| CBS01 | | 3.79 | 21.92 | | | 25.20 | 70.90 | | 0.62 | 2.13 | 0.84 | 0.41 |
| CPS15/B | | 2.24 | 12.71 | 27.90 | 35.55 | 27.00 | 70.50 | 0.83 | 0.64 | | | 0.39 |
| CPS16 | | 3.96 | 20.90 | 27.90 | | 26.00 | 70.20 | 0.89 | 0.69 | | 0.23 | 0.38 |
| CPS15 | | 2.76 | 13.37 | 28.94 | | 26.70 | 70.00 | 0.93 | 0.69 | | | 0.43 |
| CPS15 cons | | 2.76 | | 14.74 | 17.67 | 26.70 | 70.00 | 0.93 | 0.69 | | | 0.43 |
| CPS14/B | | 4.08 | 28.80 | | | 29.70 | 67.70 | 0.90 | 0.69 | | | 0.46 |
| CS03 | 1.36 | 1.55 | 5.03 | melted | | 30.20 | 67.60 | 0.15 | 0.87 | | | 0.42 |
| CS03/E | | 3.81 | 18.22 | melted | melted | 30.20 | 67.60 | 0.15 | 0.87 | | | 0.42 |
| CS03/E cons | | 3.81 | 13.67 | 28.02 | | 30.20 | 67.60 | 0.15 | 0.87 | | | 0.42 |
| CPS13 | | 6.92 | 4.00 | 38.52 | | 30.20 | 65.70 | 0.93 | 0.70 | | | 0.47 |
| CPS14 | | 1.90 | 13.10 | melted | | 30.80 | 64.80 | 0.99 | 0.80 | | | 0.48 |
| CPS14 cons | | 1.90 | 5.30 | 11.68 | 15.88 | 30.80 | 64.80 | 0.99 | 0.80 | | | 0.48 |
| CPS12 | | 8.72 | 5.93 | melted | | 32.10 | 63.80 | 0.89 | 0.75 | | | 0.49 |
| CPS11 | | 15.72 | 10.06 | melted | | 34.40 | 62.00 | 0.99 | 0.81 | | 0.10 | 0.55 |

| | Composition (wt %) | | | | | Total Solubility | SSA | Fiber | JM 28 | Total SiO₂ + B₂O₃ + ZrO₂ + 5*P₂O₅ |
|---|---|---|---|---|---|---|---|---|---|---|
| Comp. | Na₂O | K₂O | TiO₂ | Fe₂O₃ | ZnO | ppm | m²/g | Quality | sticking | |
| CBS04 | 0.17 | | | 0.24 | | 64.0 | 0.16 | Coarse | Not stuck | 80.63 |
| CBS03 | 0.18 | | | 0.18 | | 73.0 | | Coarse | Not stuck | 78.16 |
| CPS02/B | 0.13 | | | 0.16 | | 336.0 | 0.27 | Coarse | Not Stuck | 82.70 |
| CPS02 | 0.21 | | | 0.11 | | 349.6 | 0.10 | O.K fiber | Not Stuck | 83.81 |
| CPS02 cons | 0.21 | | | 0.11 | | 336.8 | 0.10 | Coarse | Not Stuck | 83.81 |
| CPS21 | 0.38 | 0.10 | | 0.20 | | 188.0 | 0.41 | O.K fiber | Not Stuck | 76.20 |
| CBS05 | 0.16 | | | 0.17 | | 117.0 | 0.35 | Coarse | Not Stuck | 77.01 |
| CPS20 | 0.18 | 0.11 | | 0.16 | | 229.0 | 0.33 | Good fiber | Not Stuck | 75.99 |
| CPS20cons | 0.18 | 0.11 | | 0.16 | | 229.0 | 0.33 | Good fiber | Not Stuck | 75.99 |
| CPS18/B | 0.19 | | | 0.15 | | 161.0 | 0.42 | Shotty | Not Stuck | 77.55 |
| CPS17/B | 0.17 | | | 0.16 | | 152.0 | 0.58 | O.K fiber | Not Stuck | 77.20 |
| CPS01/B | 0.20 | | | 0.15 | | 275.0 | 0.34 | Good fiber | Not Stuck | 80.60 |
| CPS01/C | 0.32 | | | 0.32 | | 338.8 | 0.50 | Coarse | Not Stuck | 80.50 |
| CBS02 | 0.24 | | | 0.15 | | 85.0 | | Good fiber | Not stuck | 75.06 |
| CBS07 | 0.18 | | | 0.13 | | 90.0 | 0.32 | Shotty | Not Stuck | 74.42 |
| CPS01 | 0.48 | | | 0.10 | | 286.3 | 0.13 | O.K fiber | Not Stuck | 80.95 |
| CPS01 cons | 0.48 | | | 0.10 | | 338.8 | 0.13 | Coarse | Not Stuck | 80.95 |
| CPS17 | 0.37 | 0.11 | | 0.28 | | 241.0 | 0.49 | Shotty | Not Stuck | 76.00 |
| CPS19 | 0.44 | 0.11 | | 0.18 | | 172.0 | 0.40 | Good fiber | Not Stuck | 74.05 |
| CBS01 | 0.12 | | | 0.20 | | 101.2 | 0.45 | Good fiber | Not Stuck | 73.87 |
| CPS15/B | 0.15 | | | 0.17 | | 177.0 | 0.38 | Coarse | Stuck | 74.65 |
| CPS16 | 0.53 | 0.11 | | 0.18 | | 181.0 | 0.54 | Coarse | Not Stuck | 74.88 |
| CPS15 | 0.38 | 0.12 | | 0.20 | | 166.6 | 0.61 | Coarse | Not Stuck | 74.65 |
| CPS15 cons | 0.38 | 0.12 | | 0.20 | | 166.6 | 0.61 | Coarse | Not Stuck | 74.65 |
| CPS14/B | 0.19 | 0.10 | | 0.22 | | 153.9 | 0.32 | O.K fiber | Not Stuck | 72.20 |
| CS03 | 0.21 | 0.11 | | 0.18 | | 240.5 | 0.61 | Coarse | Stuck | 68.35 |
| CS03/E | 0.21 | 0.11 | | 0.18 | | 260.0 | 0.47 | Coarse | Stuck | 68.35 |
| CS03/E cons | 0.21 | 0.11 | | 0.18 | | 260.0 | 0.47 | Coarse | Stuck | 68.35 |
| CPS13 | 0.54 | 0.13 | | 0.20 | | 163.8 | 0.44 | O.K fiber | Stuck | 70.35 |
| CPS14 | 0.30 | 0.13 | | 0.21 | | 153.9 | 0.47 | O.K fiber | Stuck | 69.75 |
| CPS14 cons | 0.30 | 0.13 | | 0.21 | | 153.9 | 0.47 | O.K fiber | Stuck | 69.75 |
| CPS12 | 0.31 | 0.14 | | 0.20 | | 165.6 | 0.55 | Lots of flake | Stuck | 68.25 |
| CPS11 | 0.31 | 0.13 | | 0.21 | | 170.5 | 0.53 | Good fiber | Stuck | 67.05 |

TABLE 4

| | Shrinkage %/24 hrs | | | | | | Composition (wt %) | | | | | | |
|---|---|---|---|---|---|---|---|---|---|---|---|---|---|
| Comp. | 1300° c. | 1350° c. | 1400° c. | 1450° c. | 1500° c. | 1550° c. | CaO | SiO₂ | P₂O₅ | Al₂O₃ | B₂O₃ | ZrO₂ | MgO |
| 50% YIELD | | 0.64 | 1.30 | 6.78 | 28.55 | 30.83 | 25.50 | 72.70 | | 0.59 | | | 0.50 |
| SPUN | | 0.38 | 0.77 | 5.48 | 30.54 | 40.30 | 25.40 | 73.10 | | 0.67 | | | 0.54 |
| BLOWN | | 0.80 | 1.30 | 7.89 | 29.43 | 39.64 | 25.30 | 73.10 | | 0.54 | | | 0.55 |
| Blanket | 0.61 | 0.90 | | | | | 23.00 | 74.60 | | 0.56 | | | 0.43 |

TABLE 4-continued

| | | | | | | | | | | |
|---|---|---|---|---|---|---|---|---|---|---|
| BAG 24 | | 0.85 | 1.43 | 4.69 | 18.36 | 25.69 | 23.18 | 75.18 | 0.66 | 0.42 |
| BAG 7 | | 0.57 | 0.84 | 2.22 | 22.32 | 26.70 | 24.26 | 73.95 | 0.63 | 0.45 |
| BAG 41 | | 0.83 | 1.02 | 1.51 | 12.12 | 17.85 | 21.62 | 76.65 | 0.79 | 0.38 |
| BAG 46 | | 1.56 | 0.96 | 1.36 | 7.69 | 12.84 | 18.70 | 79.80 | 0.81 | 0.43 |
| BAG 62 | | 0.65 | 3.24 | 8.33 | 13.25 | 22.84 | 19.74 | 76.25 | 0.47 | 0.82 | 2.27 |
| No. 3 | | | 3.36 | 8.02 | | | 19.94 | 75.35 | 0.37 | 1.11 | 2.99 |
| No. 4 | | | 2.54 | 8.12 | | | 20.81 | 75.45 | 0.39 | 1.05 | 2.87 |
| No. 5 | | | 1.96 | 6.55 | | | 20.61 | 75.28 | 0.36 | 0.99 | 2.70 |
| Blanket 1st | 0.54 | | | | | | 23.80 | 74.20 | 0.62 | 0.77 |
| Blanket Last | 1.13 | 1.37 | 6.00 | 16.21 | 28.76 | melted | 25.01 | 72.89 | 0.57 | 0.92 |
| Blanket 1st | | 1.28 | 1.79 | 2.56 | 27.17 | 25.11 | 23.80 | 74.20 | 0.62 | 0.77 |
| Blanket Last | | 1.06 | 1.35 | 1.71 | 21.38 | 31.51 | 25.01 | 72.89 | 0.57 | 0.92 |
| Bulk Hi Speed | | 1.52 | 1.81 | 13.71 | 24.15 | 24.56 | 24.90 | 72.20 | 0.72 | 0.82 |

| Comp. | Composition (wt %) | | | | | Total Solubility ppm | SSA m²/g | Fiber Quality | JM 28 sticking |
|---|---|---|---|---|---|---|---|---|---|
| | Na₂ | K₂O | TiO₂ | Fe₂O₃ | ZnO | | | | |
| 50% YIELD | | | 0.26 | 0.19 | | 232.0 | 0.22 | Very good | Not Stuck |
| SPUN | | | | 0.18 | | 254.0 | 0.23 | Very good | Not Stuck |
| BLOWN | | | | 0.22 | | 196.8 | 0.47 | Very good | Not Stuck |
| Blanket | 0.22 | 0.12 | | 0.17 | | 240.7 | 0.16 | Very good | Not Stuck |
| BAG 24 | | | | 0.17 | | 300.0 | 0.23 | Very good | Not Stuck |
| BAG 7 | | | | 0.19 | | 117.0 | 0.16 | Very good | Not Stuck |
| BAG 41 | | | | 0.17 | | 127.0 | 0.17 | Very good | Not Stuck |
| BAG 46 | | | | 0.14 | | 62.0 | 0.17 | Very good | Not Stuck |
| BAG 62 | | | | 0.15 | | 95.0 | 0.16 | Very good | Not Stuck |
| No. 3 | | | | 0.16 | | 202.8 | 1.15 | Very good | Not Stuck |
| No. 4 | | | | 0.16 | | 210.2 | 0.61 | Very good | Not Stuck |
| No. 5 | | | | 0.16 | | 229.4 | 0.88 | Very good | Not Stuck |
| Blanket 1st | | | | | | 205.2 | 0.41 | Very good | Not Stuck |
| Blanket Last | | | | | | 264.4 | 0.15 | Very good | Not Stuck |
| Blanket 1st | | | | | | 205.2 | 0.41 | Very good | Not Stuck |
| Blanket Last | | | | | | 264.4 | 0.15 | Very good | Not Stuck |
| Bulk Hi Speed | | | | | | 267.5 | 0.15 | Very good | Not Stuck |

The invention claimed is:

1. Thermal insulation comprising fibres having a composition in wt %

$72\% < SiO_2 < 86\%$ $0 < MgO < 10\%$ $14\% < CaO < 28\%$ $Al_2O_3 < 2\%$ $ZrO_2 < 3\%$ $B_2O_3 < 5\%$ $P_2O_5 < 5\%$ $95\% < SiO_2 + CaO + MgO + Al_2O_3 + ZrO_2 + B_2O_3 + P_2O_5$.

2. Thermal insulation as claimed in claim 1, in which the amount of MgO present in the fibre is less than 2.5%.

3. Thermal insulation as claimed in claim 2, in which the amount of MgO present in the fibre is less than 1.75%.

4. Thermal insulation as claimed in claim 1, in which the amount of CaO is in the range 18%<CaO<26%.

5. Thermal insulation as claimed in claim 4, in which the amount of MgO present in the fibre is less than 1.75%.

6. Thermal insulation as claimed in claim 5, in which $98\% < SiO_2 + CaO + MgO + Al_2O_3 + ZrO_2 + B_2O_3 + P_2O_5$.

7. Thermal insulation as claimed in claim 6, in which $98.5\% < SiO_2 + CaO + MgO + Al_2O_3 + ZrO_2 + B_2O_3 + P_2O_5$.

8. Thermal insulation as claimed claim 7, in which $99\% < SiO_2 + CaO + MgO + Al_2O_3 + ZrO_2 + B_2O_3 + P_2O_5$.

9. Thermal insulation as claimed in claim 1, in which $98\% < SiO_2 + CaO + MgO + Al_2O_3 + ZrO_2 + B_2O_3 + P_2O_5$.

10. Thermal insulation as claimed in claim 9, in which $98.5\% < SiO_2 + CaO + MgO + Al_2O_3 + ZrO_2 + B_2O_3 + P_2O_5$.

11. Thermal insulation as claimed claim 10, in which $99\% < SiO_2 + CaO + MgO + Al_2O_3 + ZrO_2 + B_2O_3 + P_2O_5$.

12. Thermal insulation as claimed in claim 1, having the composition:—

$72\% < SiO_2 < 80\%$ $18\% < CaO < 26\%$ $0\% < MgO < 3\%$ $0\% < Al_2O_3 < 1\%$ $0\% < ZrO_2 < 1.5\%$ $98.5\% < SiO_2 + CaO + MgO + Al_2O_3 + ZrO_2 + B_2O_3 + P_2O_5$.

13. Thermal insulation as claimed in claim 1, in which:—

$72\% < SiO_2 < 74\%$ $24\% < CaO < 26\%$.

14. Thermal insulation wholly comprising fibres as specified in claim 1.

15. Thermal insulation as claimed in claim 1, in which the thermal insulation is in the form of a blanket.

16. Thermal insulation as claimed in claim 5, in which the thermal insulation is in the form of a blanket.

17. Thermal insulation as claimed in claim 14, in which the thermal insulation is in the form of a blanket.

* * * * *